United States Patent
Schlameuss et al.

(10) Patent No.: US 11,388,008 B2
(45) Date of Patent: Jul. 12, 2022

(54) TRUSTED PLATFORM MODULE SWARM

(71) Applicant: International Business Machines Corporation, Armonk, NY (US)

(72) Inventors: Christoph Vincent Schlameuss, Waldenbuch (DE); Benno Schuepferling, Boeblingen (DE); Dennis Zeisberg, Bielefeld (DE); Volker Boenisch, Tuebingen (DE); Jakob Christopher Lang, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 16/512,878

(22) Filed: Jul. 16, 2019

(65) Prior Publication Data
US 2021/0021422 A1 Jan. 21, 2021

(51) Int. Cl.
*H04L 9/32* (2006.01)
*G06F 21/62* (2013.01)
(Continued)

(52) U.S. Cl.
CPC ............ *H04L 9/3234* (2013.01); *G06F 21/62* (2013.01); *G06F 21/71* (2013.01); *H04L 9/085* (2013.01);
(Continued)

(58) Field of Classification Search
CPC ..... H04L 9/3234; H04L 9/0825; H04L 9/085; H04L 9/0891; H04L 9/3268; G06F 21/62; G06F 21/71
See application file for complete search history.

(56) References Cited

U.S. PATENT DOCUMENTS 7,664,965 B2  2/2010  Bade et al.
7,725,703 B2  5/2010  Hunter et al.
(Continued)

FOREIGN PATENT DOCUMENTS

CN  105049443 A  * 11/2015

OTHER PUBLICATIONS

"Trusted Platform Module Library, Part 1: Architecture," Family 2.0, Level 00 Revision 01.38, https://trustedcomputinggroup.org/wp-content/uploads/TPM-Rev-2.0-Part-1-Architecture-01.38.pdf, Sep. 29, 2016, 284 pgs.
(Continued)

*Primary Examiner* — Trang T Doan
(74) *Attorney, Agent, or Firm* — Peter K. Suchecki

(57) ABSTRACT

Provided is a method and system for protecting the integrity of a computing system. The system may initialize a plurality of trusted platform modules (TPMs) within the computing system. The system may read a unique identifier corresponding to each TPM of the plurality of TPMs to determine a system state. The system may write the system state to platform configuration registers (PCRs) of each of the plurality of TPMs. The system may load a sealed private owner key part into each TPM of the plurality of TPMs. The plurality of TPMs may determine if a predetermined number of unique identifiers have been processed by validating a value of the PCRs to meet an owner key policy. The plurality of TPMs may unseal the private owner key part in each TPM where the value of the PCRs meets the owner key policy.

15 Claims, 8 Drawing Sheets

(51) Int. Cl.
*H04L 9/08* (2006.01)
*G06F 21/71* (2013.01)

(52) U.S. Cl.
CPC .......... *H04L 9/0825* (2013.01); *H04L 9/0891* (2013.01); *H04L 9/3268* (2013.01)

(56) References Cited

U.S. PATENT DOCUMENTS

| | | | |
|---|---|---|---|
| 8,340,287 | B2 | 12/2012 | Sandhu et al. |
| 8,464,091 | B2 * | 6/2013 | Butterworth ........ G06F 11/1425 714/4.1 |
| 9,026,805 | B2 | 5/2015 | Acar et al. |
| 9,122,893 | B1 * | 9/2015 | Dasari ..................... G06F 21/71 |
| 10,447,668 | B1 * | 10/2019 | Norum .................. H04L 9/3242 |
| 10,558,812 | B2 * | 2/2020 | Thom .................... H04L 9/0643 |
| 10,706,143 | B2 * | 7/2020 | Narendra Trivedi ... G06F 21/72 |
| 2004/0208316 | A1 | 10/2004 | Wack et al. |
| 2010/0202609 | A1 | 8/2010 | Sandhu et al. |
| 2010/0268812 | A1 * | 10/2010 | Mohrmann ............. G06F 21/53 718/1 |
| 2011/0138475 | A1 * | 6/2011 | Gordon ................. H04L 9/0897 726/26 |
| 2013/0047197 | A1 * | 2/2013 | Saroiu ................... H04W 12/04 726/1 |
| 2014/0007087 | A1 * | 1/2014 | Scott-Nash ............. G06F 21/53 718/1 |
| 2016/0171248 | A1 * | 6/2016 | Nesher .................... G06F 21/53 713/190 |
| 2017/0249464 | A1 * | 8/2017 | Maximov ................ G06F 21/57 |
| 2018/0234255 | A1 * | 8/2018 | Fu ............................. H04L 9/08 |
| 2018/0373881 | A1 * | 12/2018 | Thom ....................... H04L 9/30 |
| 2020/0067912 | A1 * | 2/2020 | Block ................... H04L 9/0897 |
| 2020/0099536 | A1 * | 3/2020 | Block ................... G06F 21/572 |

OTHER PUBLICATIONS

"Trusted Platform Module Library, Part 2: Structures," Family "2.0", Level 00 Revision 01.38, https://trustedcomputinggroup.org/wp-content/uploads/TPM-Rev-2.0-Part-2-Structures-01.38.pdf, Sep. 29, 2016, 166 pgs.

"Trusted Platform Module Library, Part 3: Commands," Family "2.0", Level 00 Revision 01.38, https://trustedcomputinggroup.org/wp-content/uploads/TPM-Rev-2.0-Part-3-Commands-01.38.pdf, Sep. 29, 2016, 411 pgs.

"Trusted Platform Module Library, Part 4: Supporting Routines," Family "2.0", Level 00 Revision 01.38, https://trustedcomputinggroup.org/wp-content/uploads/TPM-Rev-2.0-Part-4-Supporting-Routines-01.38.pdf, Sep. 29, 2016.

Alikhani et al., "Split and Conquer! Don't Put All Your Keys in One Basket," https://www.rsaconference.com/writable/presentations/file_upload/mbs-t11-split-and-conquer-don_t-put-all-your-keys-in-one-basket_copy1.pdf, RSA Conference 2014, Asian Pacific and Japan, 31 pgs.

Mell et al., "The NIST Definition of Cloud Computing," Recommendations of the National Institute of Standards and Technology, U.S. Department of Commerce, Special Publication 800-145, Sep. 2011, 7 pgs.

Sevinc et al., "Securing the Distribution and Storage of Secrets with Trusted Platform Modules," https://www.inf.ethz.ch/personal/basin/pubs/wistp07.pdf, WISTP 2007, LNCS 4462, pp. 53-66, 2007, ©AFIP International Federation for Information Processing 2007.

Unknown, "Technical Details on Microsoft Production Activation for Windows XP," https://technet.microsoft.com/en-us/library/bb457054.aspx, Sep. 10, 2009, printed Feb. 14, 2019, 1 pg.

* cited by examiner

US 11,388,008 B2

TRUSTED PLATFORM MODULE SWARM

BACKGROUND

The present disclosure relates generally to the field of data security, and more specifically, to a trusted platform module (TPM) swarm for protecting the integrity of a computing system.

A trusted platform module (TPM) physically secures and protects certain cryptographic key data. Each trusted platform module is unique at the point of manufacture. If a trusted platform module fails, the cryptographic key material that is protected by the device is rendered unusable. Typically, a single TPM is considered to be the root of trust for a system. In some instances, multiple TPMs may be necessary in a system to account for redundancy (e.g., a server or mainframe).

SUMMARY

Embodiments of the present disclosure include a method, system, and computer program product for generating a trusted platform module (TPM) swarm in a computing system. The system may detect a unique identifier for each TPM of a plurality of TPMs. The system may create an asymmetric owner key pair comprising a public owner key and a private owner key. The system may install the public owner key on each TPM of the plurality of TPMs. The system may split the private owner key into a plurality of private owner key parts equal to a total number of the plurality of TPMs. A private owner key part is equally distributed to each TPM of the plurality of TPMs. The system may create an owner key policy for accessing the private owner key part associated with a respective TPM. The system may seal the private owner key part in the respective TPM using the owner key policy.

Embodiments of the present disclosure include a method, system, and computer program product for protecting the integrity of a computing system using a trusted platform module (TPM) swarm. The system may initialize a plurality of trusted platform modules (TPMs) within the computing system. The system may read a unique identifier corresponding to each TPM of the plurality of TPMs to determine a system state. The system may write the system state to platform configuration registers (PCRs) of each of the plurality of TPMs. The system may load a sealed private owner key part into each TPM. The plurality of TPMs may determine if a predetermined number of unique identifiers have been processed by validating a value of the PCRs to meet an owner key policy. The plurality of TPMs may unseal the private owner key part in each TPM where the value of the PCRs meets the owner key policy.

Embodiments of the present disclosure include a system having a trusted platform module (TPM) swarm for protecting secret data. One or more processors of the system may be communicatively coupled to a plurality of trusted platform modules (TPMs). The one or more processors may read a unique identifier corresponding to each TPM of the plurality of TPMs to determine a system state. The one or more processors may write the system state to platform configuration registers (PCRs) for each of the plurality of TPMs. The one or more processors may load a sealed private owner key into each TPM. The TPM may validate a value of the PCRs to meet an owner key policy. The TPM may unseal the private owner key part in the TPM where the value of the PCRs meets the owner key policy.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
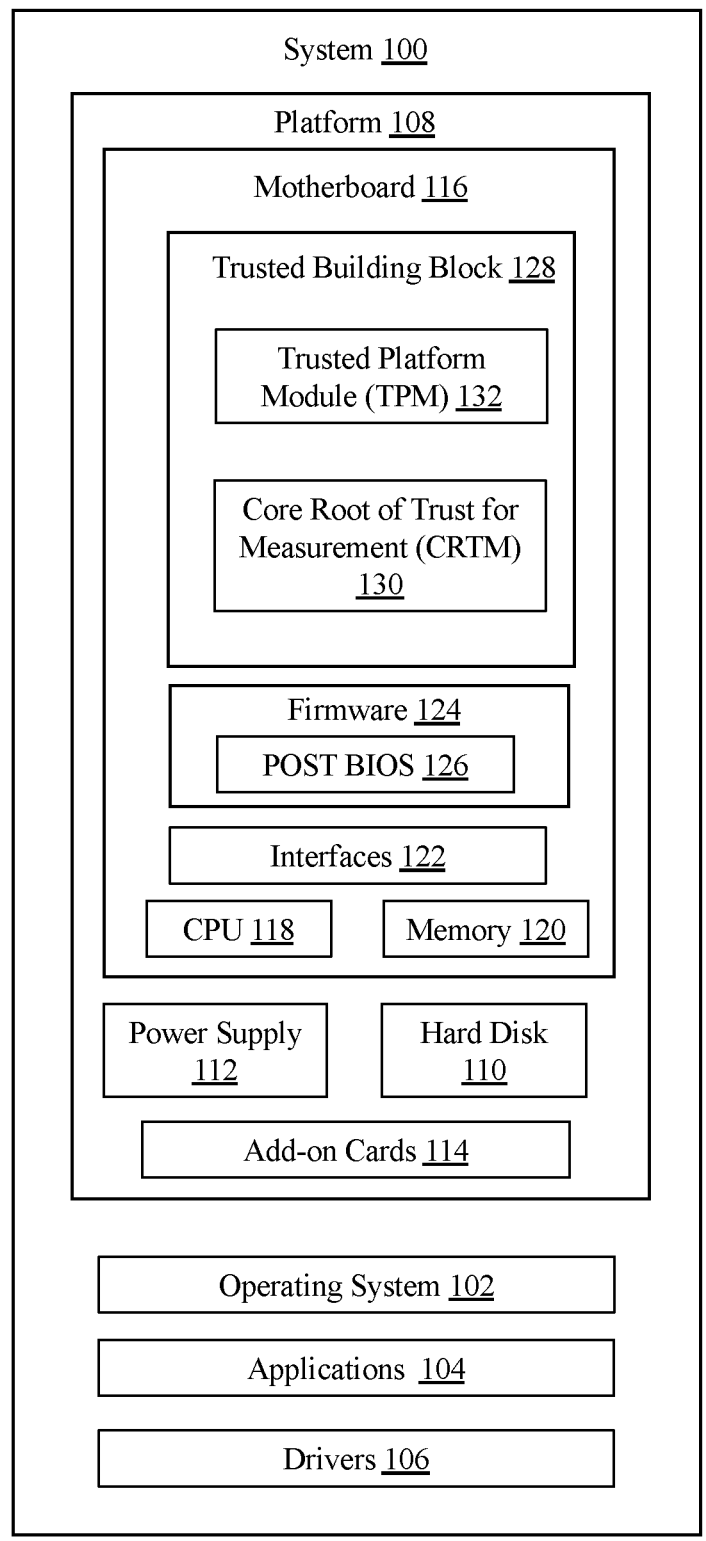
FIG. 1 illustrates a block diagram of an example trusted platform architecture, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of data security, and more particularly to a trusted platform module (TPM) swarm for protecting the integrity of a computing system. While the present disclosure is not necessarily limited to such applications, various aspects of the disclosure may be appreciated through a discussion of various examples using this context.

The integrity of a data processing system's data and its operations centers around the issue of trust. A data processing system's data and operations can be verified or accepted by another entity if that entity has some manner for establishing trust with the data processing system with respect to particular data items or particular operations.

The ability to protect a data processing system is limited by the manner in which trust is created or rooted within the data processing system. To address the issues of protecting data processing systems, a consortium of companies has formed the Trusted Computing Group (TCG) to develop and to promulgate open standards and specifications for trusted computing. According to the specifications of the Trusted Computing Group, trust within a given data processing system or trust between a data processing system and another entity is based on the existence of a hardware component within the data processing system that has been termed the trusted platform module (TPM).

A trusted platform module physically secures and protects certain cryptographic key data. Each trusted platform module is unique at the point of manufacture. If a trusted platform module fails, the cryptographic key material that is protected by the device is rendered unusable.

Many trusted platform architectures focus on low-cost security modules, which are tied to a single system, such as a desktop computer or portable computer. Although these low-cost security modules are not necessarily prone to failure, the failure of a security module within a desktop computer would generally have less costly and less labor-intensive consequences than the failure of a similar security module within a high-performance server, which are often manufactured with redundant capabilities in order to avoid an unacceptable single point of failure.

Typically, a single TPM is the root of trust for a system. In some instances, multiple TPMs may be necessary in a system to account for redundancy. However, using a set of TPMs for redundancy contradicts the one-to-one relationship between a TPM and the root of trust. In some systems, to use multiple TPMs to account for redundancy, the secret held by each TPM is replicated over the multiple TPMs. For example, each TPM (e.g., TPM A, TPM B, TPM N) may comprise the same identity. However, this may pose a security problem, since each TPM holds the same secret. For example, any of the TPMs (e.g., TPM A, TPM B, TPM N) may be removed from the system and through computer hacking the secret may be accessed.

Embodiments of the present disclosure create a root of trust using a plurality of TPMs (e.g., TPM swarm), wherein the identity is split into parts across each TPM. Further, access to the identity (e.g., using cryptographic key parts) is split across the TPMs. In embodiments, the TPM swarm remains an operational root of trust upon failing of one or more of the TPMs up to a predefined number. For example, a TPM swarm containing 9 TPMs may remain operational if 6 of 9 TPMs are available (e.g., two-thirds). However, if only 5 TPMs are available out of the 9 TPMs, the root of trust is invalid and access to the system's secrets (e.g., owner key or secret data stored within the system according to one or more access policies) will be denied. In this way, only a predetermined combination of TPMs (TPM swarm) will grant access to the system. The predetermined number of TPMs necessary to obtain access to the system allows the system to remain available in the event one or more TPMs fail up to a specified number. Splitting the identity and private key into parts across the TPM swarm further maintains security of the system by preventing access to the system through a single TPM (e.g., removing a single TPM and trying to obtain the secret data).

In embodiments, the TPM swarm may be generated by wiping a plurality of trusted platform modules (TPMs). For example, to create the TPM swarm each TPM may be wiped in order to generate a fresh swarm. Each TPM must contain an endorsement certificate comprising a unique identifier (UID) from a trusted vender verifying the integrity of the TPM. The UID is preserved during the wiping process.

In embodiments, once the wiping process is complete, the UID associated with each TPM of the TPM swarm (e.g., UIDa, UIDb, UIDn) may be detected by the system. Once the unique identifier is detected for each TPM within the swarm, an access policy (e.g., platform configuration register (PCR) function) defining the rules under which each TPM may permit access to its secret data may be created. For example, this process may be performed by using a PCR function for TPMs={a, b, n}.

For example, PCR=SUM(TPMs)||SUM(TPMs-a)||SUM(TPMs-b)|| . . . [logical OR].

In embodiments, the PCR function requires a predetermined number of TPMs to be available in order to gain access to the TPM's data (e.g., UIDa^UIDb^UIDn||UIDa^UIDb||UIDa^UIDn||UIDb^UIDn).

The predetermined number of TPM availability may be set to any number (e.g., 8 out of 10 TPMs, 6 out of 10 TPMs, 4 out of 5 TPMs) depending on the design of the system. For example, in an embodiment, to decrypt a TPM's secret data, a minimum of two-thirds of the TPM swarm (e.g., UIDa and UIDn) must be available and the value of the PCRs must be determined to be valid according to an access policy.

In embodiments, once the UIDs are detected for the TPM swarm, an asymmetric owner key pair comprising a public owner key and a private owner key is generated from a key generator. The public owner key is installed on each TPM of the TPM swarm. The private owner key is split into a plurality of private owner key parts equal to a total number (n) of TPMs within the TPM swarm. Splitting the private owner key into n parts may be performed by utilizing Shamir's Secret Sharing algorithm, where a secret (e.g., private owner key) is divided into parts, giving each respective TPM its own unique private owner key part.

Once the private owner key is split into parts, a single private owner key part is stored on each respective TPM of the TPM swarm. An owner key policy is created for accessing the private owner key part on the respective TPM. The owner key policy must match the PCR function above to reconstruct the private owner key from a minimum number (k) of private owner key parts. In this way, the private owner key parts may only be accessible if the predetermined number of UIDs are available corresponding to the TPM swarm.

In Shamir's algorithm's threshold scheme, the number (k) is less than the total number (n) of parts. Otherwise, all TPMs would be needed to reconstruct the private owner key. Once the owner key policy is created, each private owner key part is sealed (e.g., access requires that some set of PCRs has defined values, or an authorization value needed for access) in the respective TPM using the owner key policy. In embodiments, the private owner key may be forgotten (e.g., erased) such that the system becomes self-administering.

In embodiments, once the TPM swarm has been created by sealing the private owner key parts within each TPM according to the owner key policy, the TPM swarm may be used to protect the integrity of the system. For example, the owner key policy may be configured to control access to disk encryption keys such that the system will not boot without fulfilling the owner key policy. In another example, the owner key policy may be configured to control access to specific application secrets, such that the system may boot and be accessed, but the function requiring the specific secrets cannot be executed without fulfilling the owner key policy.

In embodiments, additional access policies for sealing and/or accessing secret data within the system and/or each TPM may be created and signed with the private owner key. For example, access polices may be created that include the owner policy and other attributes (e.g., PCR values, dates, software versions, hardware serial numbers, etc.) that must be validated to gain access to secret data. In other embodiments, access policies may be created that do not include the owner key policy.

In embodiments, once access to the private owner key has been obtained, the owner key policy may be changed and/or new access conditions may be created. For example, in order to add a new TPM to the TPM swarm, the owner key policy may be updated or reinitialized using a new pair of owner keys. This allows one or more TPMs that have become defective and/or unavailable to be replaced.

The aforementioned advantages are example advantages, and not all advantages are discussed. Furthermore, embodiments of the present disclosure can exist that contain all, some, or none of the aforementioned advantages while remaining within the spirit and scope of the present disclosure.

Figure 2:
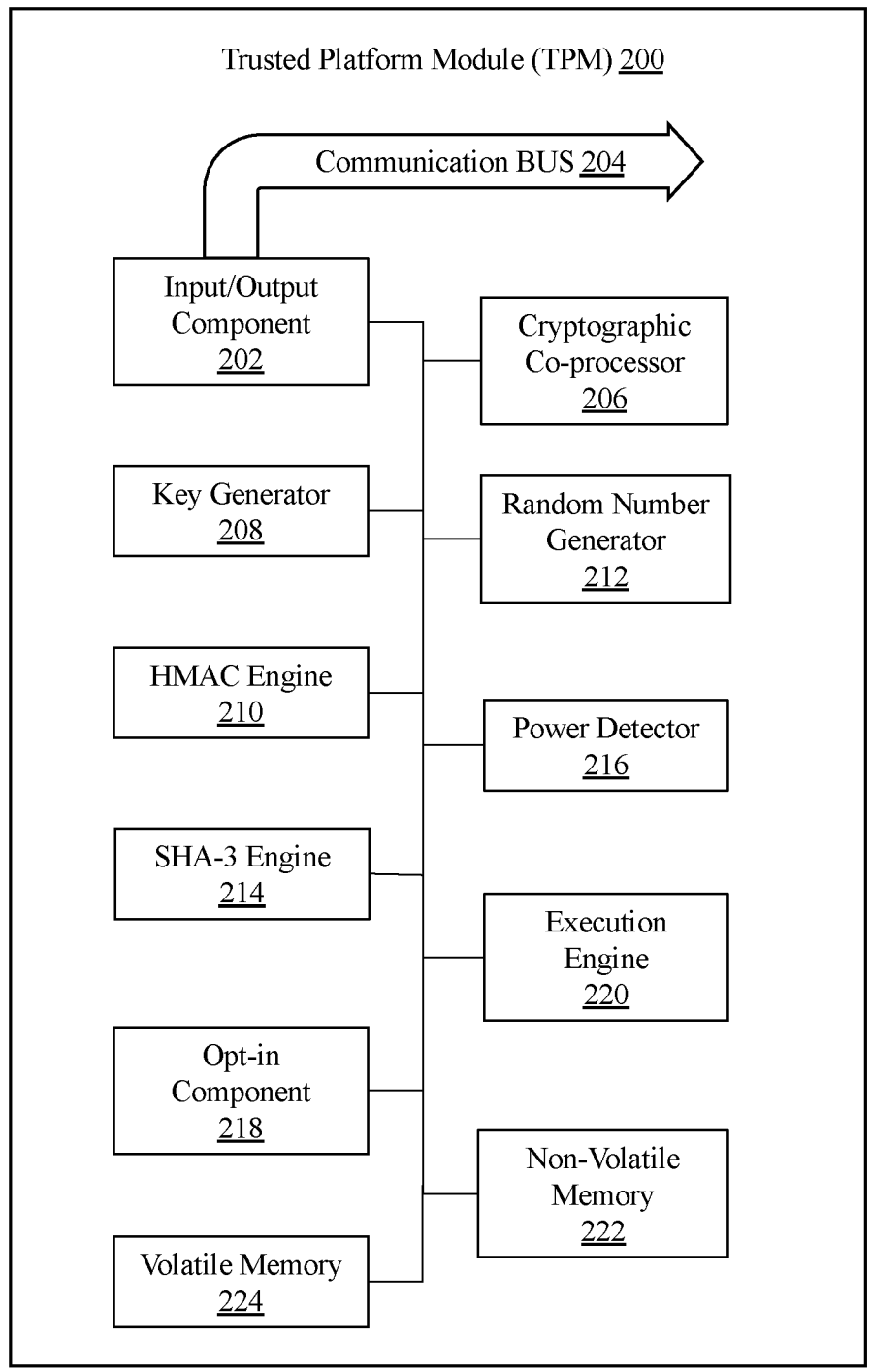
FIG. 2 illustrates a block diagram of an example trusted platform module, in accordance with embodiments of the present disclosure.

The present disclosure may be implemented on a variety of hardware and software platforms, as described with respect to FIG. 1 and FIG. 2. More specifically, though, the present disclosure is directed to enabling trusted computing platforms. Before describing the present disclosure in more detail, though, some information about trusted computing platforms is provided for evaluating the operational efficiencies and other advantages of the present disclosure. Although the present disclosure may be implemented in conjunction with a variety of trusted computing platforms, possibly in accordance with one or more standards, the examples of the present disclosure herein employ the terminology and examples from the standards and/or specifications that have been promulgated by the Trusted Computing Group (TCG); it should be noted, though, that the examples are not meant to imply architectural, functional, nor definitional limitations with respect to embodiments of the present disclosure.

With reference now to FIG. 1, shown is a block diagram of an example trusted platform architecture, in accordance with embodiments of the present disclosure. Trusted platform architectures may be implemented for particular computational environments or for particular classes of devices; FIG. 1 depicts a trusted platform architecture in accordance with the TCG's PC-specific implementation specification.

System 100 supports execution of software components, such as operating system 102, applications 104, and drivers 106, on its platform 108. The software components may be received through a network, such as cloud computing environment 50 that is detailed in FIG. 7 and FIG. 8, or they may be stored, e.g., on hard disk 110. Platform 108 receives electrical power from power supply 112 for executing the software components on add-on cards 114 and motherboard 116, which includes typical components for executing software, such as CPU 118 and memory 120, although motherboard 116 may include multiple CPU's. Interfaces 122 connect motherboard 116 to other hardware components within system 100, and firmware 124 contains POST BIOS (power-on self-test basic input/output system) 126.

Motherboard 116 also comprises trusted building block (TBB) 128; motherboard 116 is supplied by a manufacturer with TBB 128 and other components physically or logically attached and supplied by the manufacturer. TBB 128 comprises the combination of the core root of trust for measurement (CRTM) component 130, the trusted platform module (TPM) 132, the connection of the CRTM to motherboard 116, and the connection of the TPM to motherboard 116.

TPM 132 is explained in more detail with respect to FIG. 2. CRTM 130 is an immutable portion of the platform's initialization code that executes upon a platform reset; the platform's execution must begin at the CRTM upon any platform reset event. In this manner, the trust in the platform is based on the CRTM and the behavior of the TPM, and the trust in all measurements is based on the integrity of the CRTM. In the example that is shown in FIG. 1, the BIOS may be assumed to include a BIOS Boot Block and POST BIOS 126; each of these are independent components that can be updated independent of each other, wherein the manufacturer must control the update, modification, and maintenance of the BIOS Boot Block, but a third party supplier may update, modify, or maintain the POST BIOS component. In the example that is shown in FIG. 1, the CRTM may be assumed to be the BIOS Boot Block, and the POST BIOS 126 is a measured component of the chain of trust. Alternatively, the CRTM may comprise the entire BIOS.

Referring now to FIG. 2, shown is a block diagram of an example trusted platform module 200, in accordance with embodiments of the present disclosure. In some embodiments, TPM 200 may be the same as, or substantially similar to, TPM 132 described in reference to FIG. 1. Trusted platform module 200 comprises input/output component 202, which manages information flow over communications bus 204 by performing appropriate protocol encoding/decoding operations and routing of messages to appropriate components. Cryptographic co-processor 206 performs cryptographic operations within a trusted platform module. Key generator 208 creates symmetric keys and RSA asymmetric cryptographic key pairs. HMAC engine 210 performs HMAC (Keyed-Hashing for Message Authentication) calculations, whereby message authentication codes are computed using secret keys as integrity checks to validate information transmitted between two parties, e.g., in accordance with Krawczyk et al., "HMAC: Keyed-Hashing for Message Authentication", Request for Comments (RFC) 2104, Internet Engineering Task Force (IETF), February 1997.

Random number generator 212 acts as a source of randomness for the computation of various values, such as nonces, keys, or other values. SHA-3 engine 214 implements the SHA-3 hash algorithm. Power detector 216 manages the power states of a trusted platform module in association with the power states of the platform. Opt-in component 218 maintains the state of persistent and volatile flags and enforces semantics associated with those flags such that the trusted platform module may be enabled and disabled. Execution engine 220 runs program code to execute commands that the trust platform module receives through input/output component 202. Non-volatile memory 222 stores persistent identity and state associated with the trusted platform module; the non-volatile memory may store static data items but is also available for storing dynamic data items by entities that are authorized by the trusted platform module owner, whereas volatile memory 224 stores dynamic data items.

Given the background information on trusted computing platforms that has been described with respect to FIG. 1 and FIG. 2, a detailed description of the present disclosure is provided herein with respect to the remaining figures. As noted above, typical trusted platforms have been designed such that a trusted platform module exists within a trusted platform architecture as a potentially catastrophic single point of failure, which would be unacceptable behavior in a high-performance server or similar high-cost computing device. The present disclosure addresses this problem by providing a trusted platform module swarm as explained in more detail herein.

Figure 3:
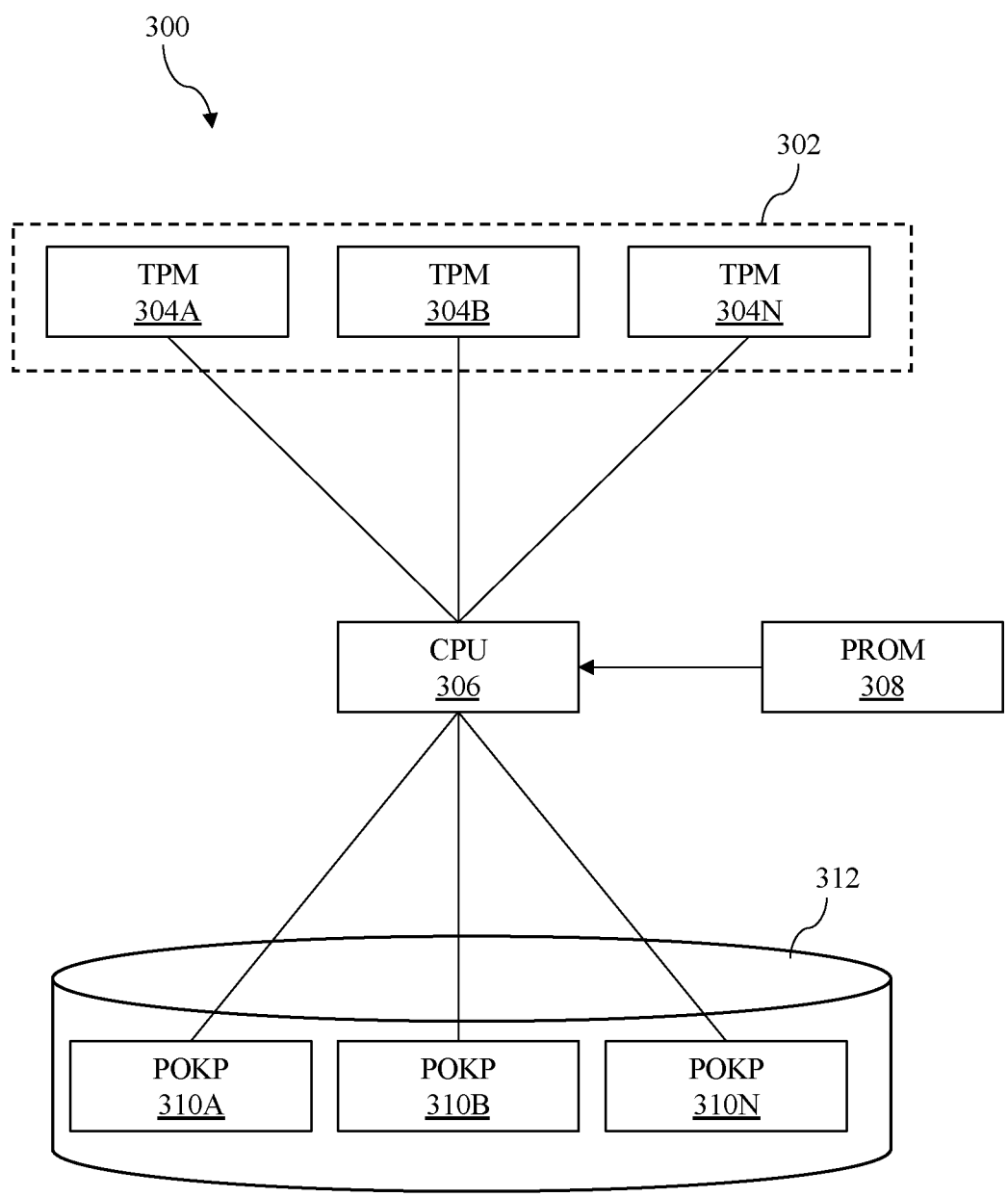
FIG. 3 illustrates a block diagram of an example trusted platform module swarm, in accordance with embodiments of the present disclosure.

Referring now to FIG. 3, shown is a block diagram of an example system 300 utilizing a trusted platform module (TPM) swarm 302, in accordance with embodiments of the present disclosure. In embodiments, the system 300 may be substantially similar to system 100 detailed in FIG. 1. In the illustrated embodiment, the system 300 includes TPM swarm 302, central processing unit (CPU) 306, programmable read-only memory (PROM) 308, and storage component 312. TPM swarm 302 comprises TPM 304A, TPM 304B, and TPM 304N (collectively referred to as TPM 304). Each TPM 304 may be substantially similar to TPM 200 detailed in FIG. 2. Storage component 312 comprises private owner key part (POKP) 310A, POKP 310B, and POKP 310N (collectively referred to as POKPs 310).

In the illustrated embodiment, to gain access to system 300 (e.g., to load the operating system), the TPM swarm 302 must be verified according to an owner key policy and/or any access policy signed with the owner key. The owner key policy may be set to require a minimum number of TPMs 304 within the TPM swarm 302 to be valid and available. For example, system 300 may require two out of the three TPMs 304 to be valid (e.g., TPM 304A and TPM 304B verified to be valid while TPM 304N may be defective) in order to boot the system.

In embodiments, to initialize the TPM swarm 302 of system 300, PROM 308 loads the core root of trust measurement (CRTM) into CPU 306. This is performed when the system 300 is first restarted. The CRTM, being the first software to run, cannot be measured or validated. The platform manufacturer can protect the CRTM from attack by making it immutable by putting it in PROM 308.

Once the CRTM is loaded into CPU 306, each TPM 304 is recognized by reading the identity of each TPM 304 within the TPM swarm 302 to determine the system state (e.g., the number and UID of all connected TPMs). The CPU 306 may write the system state to platform configuration registers (PCRs). The PCRs provides a method to cryptographically record (measure) software and hardware state: both the software running on a platform and configuration data used by that software. The CPU 306 may ensure that the trusted code base of each TPM is valid. The CPU 306 may load the POKPs 310 from storage 312 if a predetermined amount of TPMs are available (e.g., two-thirds of TPM swarm 302) according to the owner key policy. If owner key policy is met, each sealed POKP 310 is loaded into the respective TPM. Once access is granted to decrypt the POKPs 310, a private owner key may be reconstructed. In embodiments, the private owner key may be used to sign one or more access policies and/or access conditions for accessing secret data sealed on the system and/or each respective TPM. The access policies may be configured to unseal any secret data resulting from the access policy being met.

It is noted that FIG. 3 is intended to depict the representative major components of system 300. In some embodiments, however, individual components may have greater or lesser complexity than as represented in FIG. 3, components other than or in addition to those shown in FIG. 3 may be present, and the number, type, and configuration of such components may vary. Likewise, one or more components shown with the system 300 may not be present, and the arrangement of components may vary.

For example, while FIG. 3 illustrates an example system 300 having a single CPU 306, three TPMs 304, and three POKPs 310, suitable network architectures for implementing embodiments of this disclosure may include any number of CPUs, TPMs, and POKPs. The various models, modules, systems, and components illustrated in FIG. 3 may exist, if at all, across a plurality of CPUs, TPMs, and POKPs.

Figure 4:
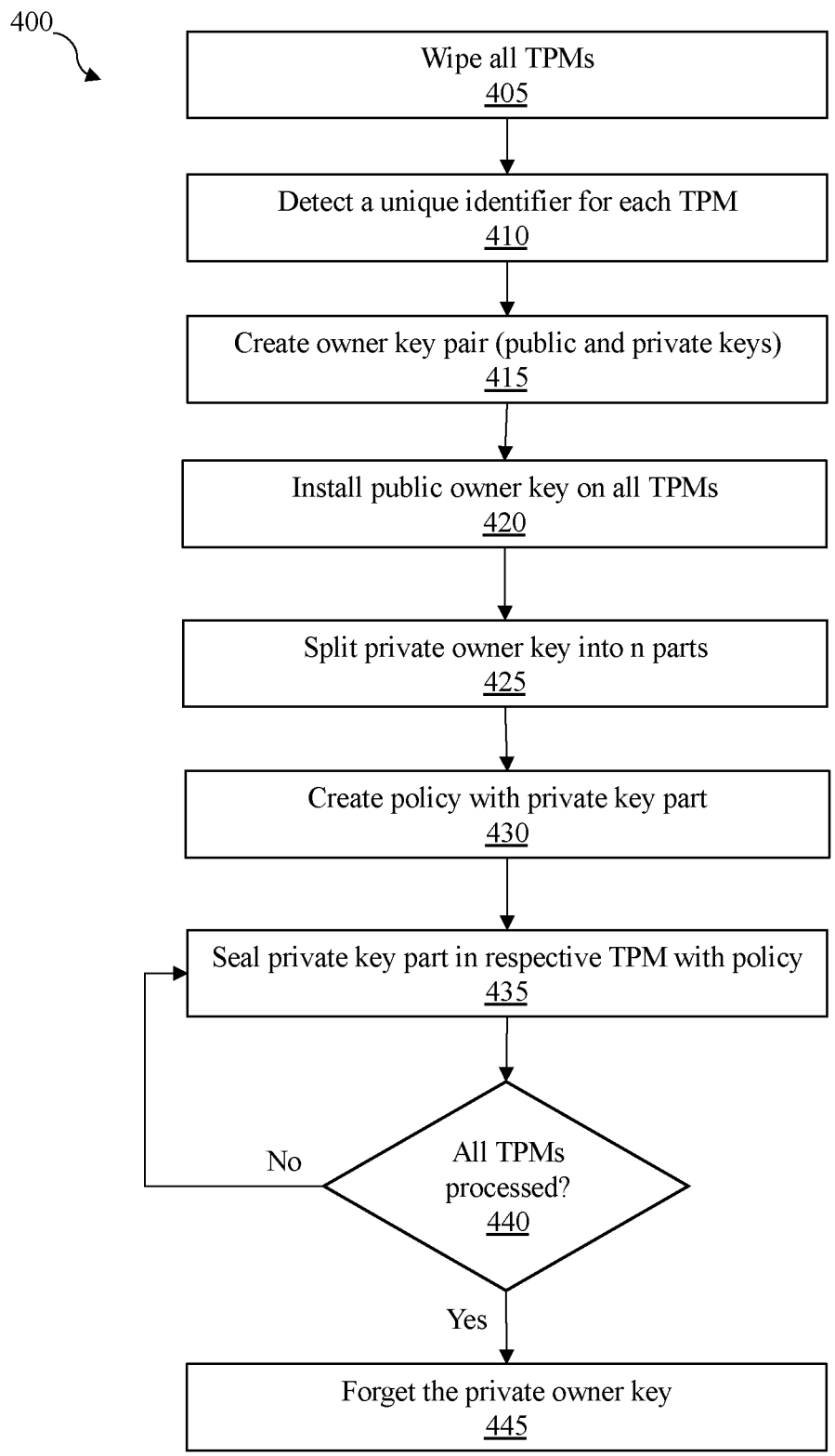
FIG. 4 illustrates a flow diagram of an example process for initializing a trusted platform module swarm, in accordance with embodiments of the present disclosure.

Referring now to FIG. 4, shown is a flow diagram of an example process 400 for initializing a trusted platform module swarm, in accordance with embodiments of the present disclosure. The process 400 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 400 is a computer-implemented process. In embodiments, the process 400 may be performed by one or more processors (e.g., cryptographic co-processor 206 exemplified in FIG. 2).

In embodiments, the process 400 begins by wiping a plurality of trusted platform modules (TPMs). This is illustrated at step 405. Wiping each of the TPMs removes any previously stored cryptographic data while leaving a unique identifier (UID) associated with the respective TPM preserved. In some embodiments, step 405 may not be necessary if no previous cryptographic data has been stored on the respective TPM(s). In embodiments, step 405 may be performed when adding one or more new TPMs to a previously initialized TPM swarm as detailed in FIG. 7.

The process 400 continues by detecting the UID for each TPM of the plurality of TPMs. This is illustrated at step 410. The process 400 continues by creating, in response to detecting the UID for each TPM, an asymmetric owner key pair comprising a public owner key and a private owner key. This is illustrated at step 415. In embodiments, the asymmetric owner key pair comprising a public owner key and a private owner key may be generated from a key generator (e.g., key generator 208 as shown in FIG. 2).

Once the owner key pair is generated, the process 400 continues by installing the public owner key on each TPM of the plurality of TPMs. This is illustrated at step 420. The process 400 continues by splitting the private owner key into a plurality of private owner key parts equal to a total number (n) of the plurality of TPMs, wherein a private owner key part is stored on a respective TPM of the plurality of TPMs. This is illustrated at step 425. Splitting the private owner key into n parts may be performed by utilizing Shamir's Secret Sharing algorithm, where a secret (e.g., private owner key) is divided into parts, giving each TPM its own unique part.

The process 400 continues by creating an owner key policy for accessing the private owner key part on the respective TPM. This is illustrated at step 430.

For example, this process may be performed by using a PCR function for TPMs={a, b, n}.

For example, PCR=SUM(TPMs)∥SUM(TPMs-a)∥SUM(TPMs-b)∥ . . . [logical OR].

In embodiments, the PCR function requires a predetermined amount of TPMs (e.g., UIDa^UIDb^UIDn∥UIDa^UIDb∥UIDa^UIDn∥UIDb^UIDn) to be available in order to gain access to the TPM's owner key part and/or any secret data sealed using one or more access policies (e.g., the owner key policy or a new access policy) signed with the private owner key.

For example, in an embodiment, to decrypt a TPM's secret data, a minimum of two-thirds of the TPM swarm (e.g., UIDa and UIDn) must be determined to available and valid meeting the access policy. In other embodiments, any predetermined amount of available TPMs (e.g., 8 of 10 TPMs, 3 of 6 TPMs, etc.) may be required to meet the access conditions for one or more access policies.

In embodiments, the owner key policy must match the PCR function above to reconstruct the private owner key from a minimum number (k) of private owner key parts. In this way, the private owner key parts may only be accessible if the predetermined number of UIDs are available corresponding to the TPM swarm. In Shamir's algorithm's threshold scheme, the number (k) is less than the total number (n) of parts. Otherwise all TPMs would be needed to reconstruct the private owner key. For example, the owner key policy may allow access to the private owner key parts if 5 of 10 TPMs are available within the TPM swarm. In other embodiments, any predetermined number of TPMs may be set within the owner key policy to allow access to the private owner key parts.

The process 400 continues by sealing the private key part in the respective TPM using the owner key policy. This is illustrated at step 435. The process 400 continues by determining if each TPM has been processed to seal a private owner key part within the respective TPM according to the owner key policy. This is illustrated at step 440. If "no" at step 440, the process returns to step 435 to seal a private owner key part within any unprocessed TPMs. If "yes" at step 440, the process 400 continues by forgetting (e.g., erasing) the private owner key. This is illustrated at step 445. In this way, the system can become a self-administering system, such that no human intervention is necessary in order to grant access to the system which increases the data security of the system.

In embodiments, once the TPM swarm has been validated according to the owner key policy, the owner key policy may be changed by reconstructing the private owner key. For example, the owner key policy may be changed in order to add a new TPM to the TPM swarm to replace a defective or invalid TPM.

In embodiments, other secret data (e.g., confidential data, other keys used for securing applications, personally identifiable information, user data, etc.) may be sealed in the TPMs and/or the system using the owner key policy or one or more new access policies signed with the private owner key. In embodiments, the access policies may comprise the owner key policy and one or more additional tributes. For example, the access policies may include validating the PCR values and additional attributes, such as software version, hardware serial numbers, etc. In some embodiments, the access policy may not include the owner key policy.

In embodiments, the access policies may be static policies or dynamic policies. A static policy is a policy that cannot be updated. A dynamic policy may be used to validate externally signed access conditions. For example, accessing the private owner key part stored in each TPM of the plurality of TPMs (e.g., TPM swarm) allows for the private owner key to be reconstructed to sign a new set of access conditions by a TPM external entity.

Figure 5:
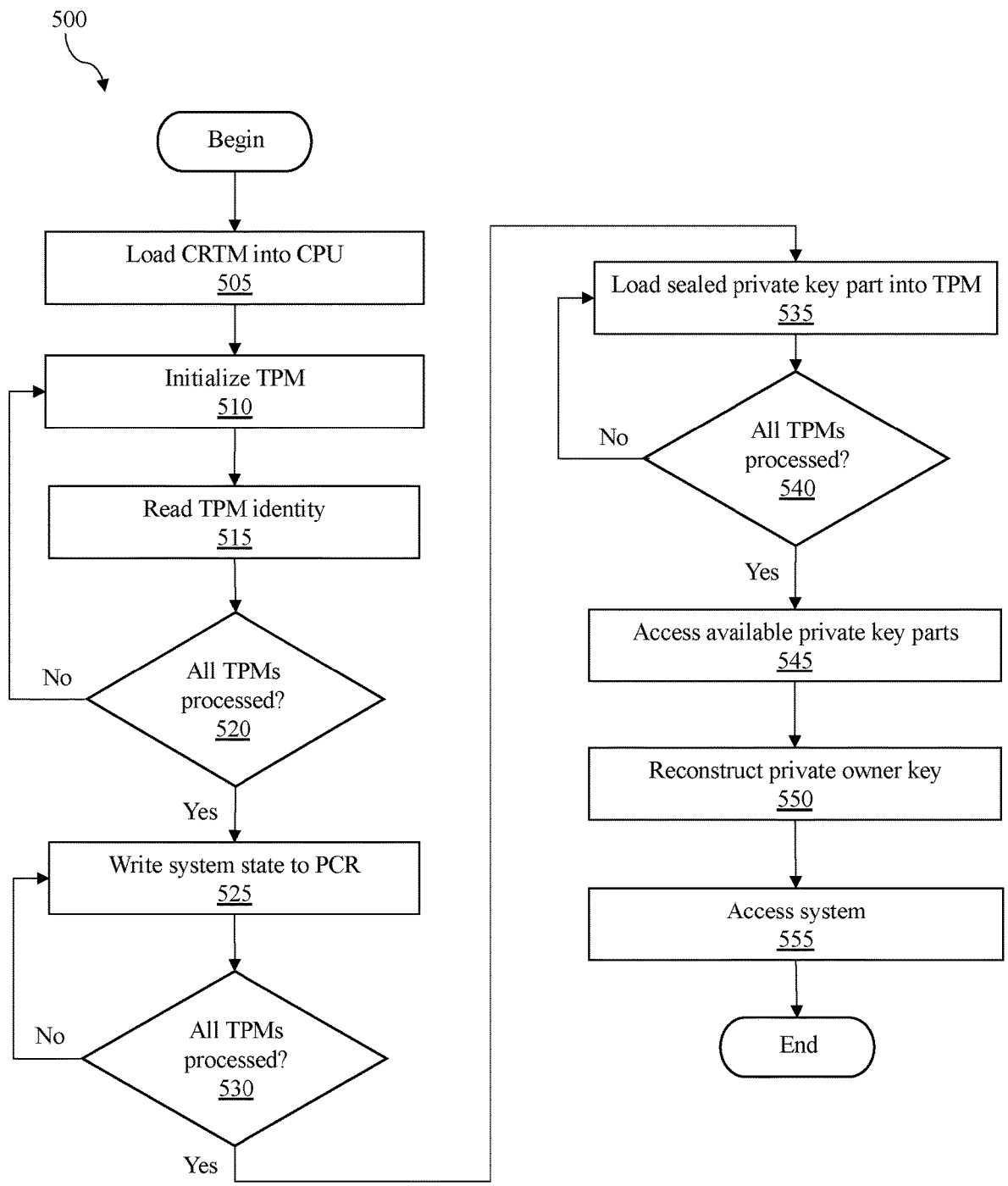
FIG. 5 illustrates a flow diagram of an example process for booting a system using a trusted platform module swarm, in accordance with embodiments of the present disclosure.

Referring now to FIG. 5, shown is a flow diagram of an example process 500 for booting a system using a trusted platform module swarm, in accordance with embodiments of the present disclosure. The process 500 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 500 is a computer-implemented process. In embodiments, the process 500 may be performed by one or more processors (e.g., cryptographic co-processor 206 exemplified in FIG. 2). The process 500 utilizes the TPM swarm described in FIG. 3 and FIG. 4.

In embodiments, in order for the process 500 to begin the CRTM must first be loaded into the CPU. This is illustrated at step 505. Once the CRTM is loaded into the CPU, the process 500 continues by initializing each TPM of a plurality of TPMs (e.g., the TPM swarm). This is illustrated at step 510.

The process 500 continues by reading the identity (e.g., a unique identifier corresponding to each TPM) of each TPM of the TPM swarm to determine a system state. This is illustrated at step 520.

The process 500 continues by determining if a predetermined number of unique identifiers have been processed. This is illustrated at step 520. The predetermined number of unique identifiers corresponds to the PCR function detailed above. If the predetermined number of identities have not yet been processed, "no" at step 520, the process 500 returns to step 510 to initialize any unprocessed TPMs. If all TPMs meeting a predetermined number of unique identifiers have been processed, "yes" at step 520, the process 500 continues by writing the system state to platform configuration registers (PCRs) for each TPM of the TPM Swarm. This is illustrated at step 525.

The process 500 continues by determining if the system state of each TPM has been processed. This is illustrated at step 530. If "no" at step 530, the process returns to step 525 to write the system state of any unprocessed TPM(s) to the PCRs. If "yes" the process 500 continues by loading the sealed private owner key part into each respective TPM. This is illustrated at step 535. In embodiments, the system may load any sealed secret data that has been sealed in each TPM and/or in the system itself at this step (as described in FIG. 6). For example, secret data may have been sealed according to one or more access policies. In embodiments, the access policies may comprise the owner key policy and additional attributes for gaining access to the sealed secret data. In other embodiments, an access policy may be a standalone policy that does not include the owner key policy.

The process 500 continues by determining if a predetermined number of private owner key parts have been loaded into each respective TPM to meet an owner key policy. This is illustrated at step 540. If "no" at step 540, the process returns to step 535 to load the sealed private owner key part into any unprocessed TPM. If the predetermined amount of TPMs are available and all have been processed, "yes" at step 540, the process 500 continues by accessing the available private owner key parts. This is illustrated at step 545. In other embodiments, the system may load secret data into the TPM to allow access to the secret data if the access policy has been met. In embodiments, access to the secret data will allow various functions to be performed by the system (e.g., booting the system, accessing secured data, initiating various applications, etc.)

In some embodiments, once the system has access to the available private owner key parts by meeting the owner key policy, the process 500 continues by reconstructing the private owner key. This is illustrated at step 550. Once the private owner key is reconstructed, the process 500 continues by accessing the identity of the system. This is illustrated at step 555. Once the access has been granted to the system by meeting the owner key policy, any encrypted data may now be read. Further, access to the owner key may allow the owner key policy to be changed. In embodiments, access to the owner key may allow for additional access policies to be created to seal other secret data within the TPMs or the system. Once the additional access policies are created, the respective policies may be signed with the owner key.

In embodiments, if the owner key policy has failed to be met (e.g., only 5 valid TPMs are available when 6 TPMs of the swarm are necessary to access the sealed private owner key parts according to the policy), access to the owner key and/or system will be denied.

Figure 6:
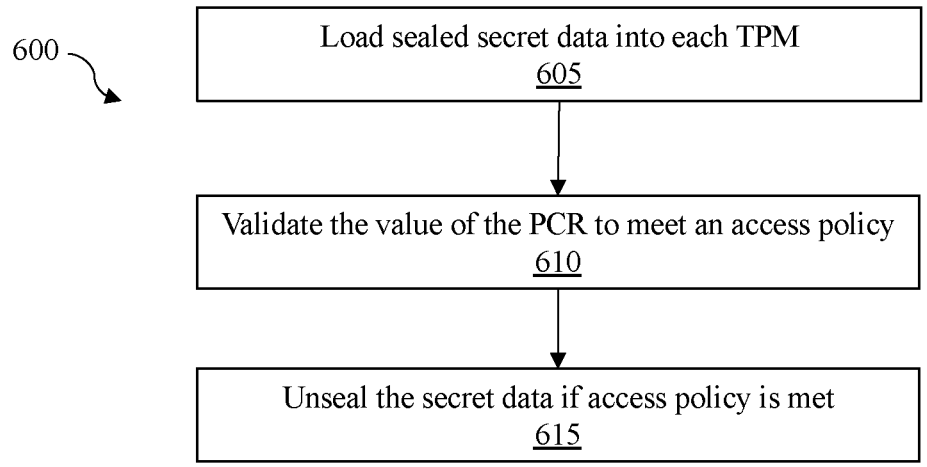
FIG. 6 illustrates a flow diagram of an example process for unsealing secret data using a trusted platform module swarm, in accordance with embodiments of the present disclosure.

Referring now to FIG. 6, shown is a flow diagram of an example process 600 for unsealing secret data using a trusted platform module swarm, in accordance with embodiments of the present disclosure. The process 600 may be in addition to or a subset of process 500. The process 600 may be performed by processing logic that comprises hardware (e.g., circuitry, dedicated logic, programmable logic, microcode, etc.), software (e.g., instructions run on a processor to perform hardware simulation), firmware, or a combination thereof. In embodiments, the process 600 is a computer-implemented process.

The process 600 begins by loading secret data into each TPM of the TPM swarm. In embodiments, the secret data may be sealed using an access policy signed with the private owner key. In embodiments, the secret data may be sealed within each TPM by performing a method similar to process 400 detailed in FIG. 4 where the secret data is split across each TPM and sealed with an access policy. In embodiments, the access policy may or may not include the owner key policy and/or additional policy attributes.

The process 600 continues by determining, by the plurality of TPMs, if the access policy has been met. This is illustrated at step 610. In embodiments, the access policy may be met if the value of the PCRs for each available TPM are valid according to the access policy. In embodiments, the access policy requires a predetermined number of unique identifiers corresponding to the TPMs to be available. If the predetermined number of unique identifiers are not available or the PCRs are invalid, access to the secret data will be denied.

The process 600 continues by unsealing, in response to the access policy being met, the secret data. Once the PCRs are determined to be valid for the available TPMs, the secret data may be unsealed.

Figure 7:
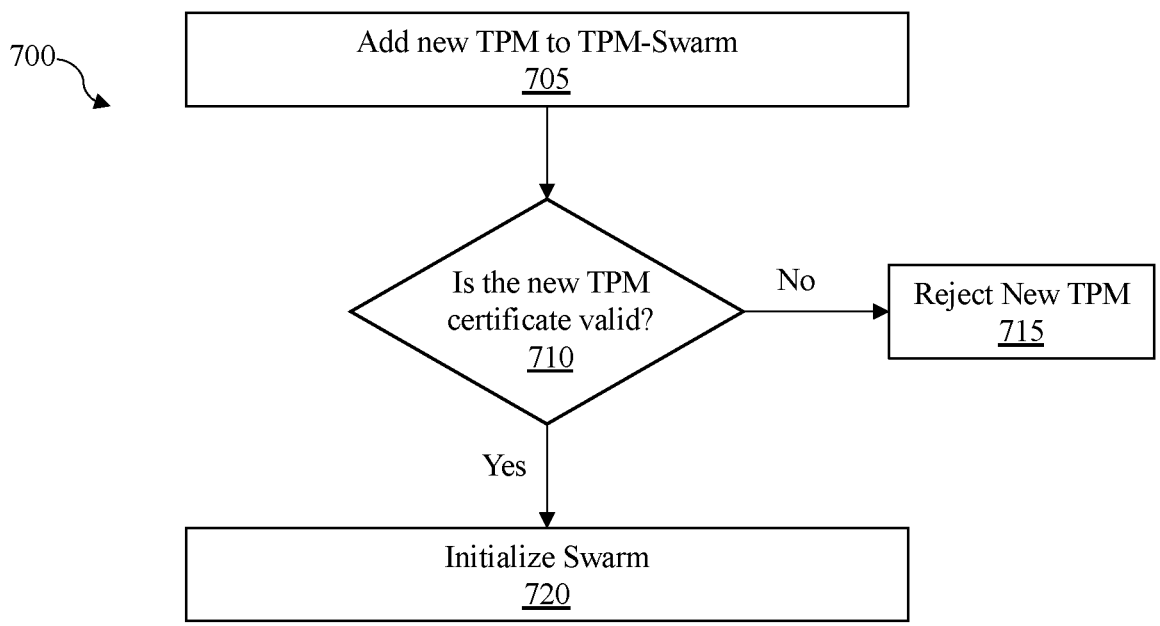
FIG. 7 illustrates a flow diagram of an example process for adding a trusted platform module to a trusted platform module swarm, in accordance with embodiments of the present disclosure.

Referring now to FIG. 7, shown is a flow diagram of an example process 600 for adding a trusted platform module to a trusted platform module swarm, in accordance with embodiments of the present disclosure. The process 700 may be in addition to or a subset of process 400. The process 700 may be performed by processing logic that comprises hardware (e.g., circuitry, dedicated logic, programmable logic, microcode, etc.), software (e.g., instructions run on a processor to perform hardware simulation), firmware, or a combination thereof. In embodiments, the process 700 is a computer-implemented process.

The process 700 begins by adding a new TPM to a computing system. This is illustrated at step 705. Adding a new TPM to the TPM swarm requires the new TPM to be manufactured from a trusted vendor. Once the TPM is added to the computing system, the process 700 continues by determining if an endorsement certificate of a new TPM is valid. This is illustrated at step 710. The endorsement certificate includes a unique identifier that is associated with each respective TPM. If the endorsement certificate is determined to be invalid (e.g., not from a trusted vendor), "no" at step 710, the new TPM is rejected from being added to the TPM swarm. This is illustrated at step 715. If the new TPM is determined to be valid (e.g., endorsement certificate from a trusted vendor), "yes" at step 710, the new TPM may be added to the TPM swarm by initializing the TPM swarm. This is illustrated at step 720. Step 720 if further detailed in FIG. 4. In embodiments, the new TPM may be wiped of any preexisting cryptographic data and the unique identifier will preserved. In embodiments, when adding the new TPM to a previously initialized TPM swarm, all the previously sealed key parts (e.g., as detailed in FIG. 4) may be discarded and the TPM swarm may be re-initialized by wiping all the TPMs. This approach is more secure for maintaining the integrity of the system. However, in other embodiments, the new TPM to be added to the TPM swarm may be updated by reconstructing the owner key and signing a new owner key policy.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
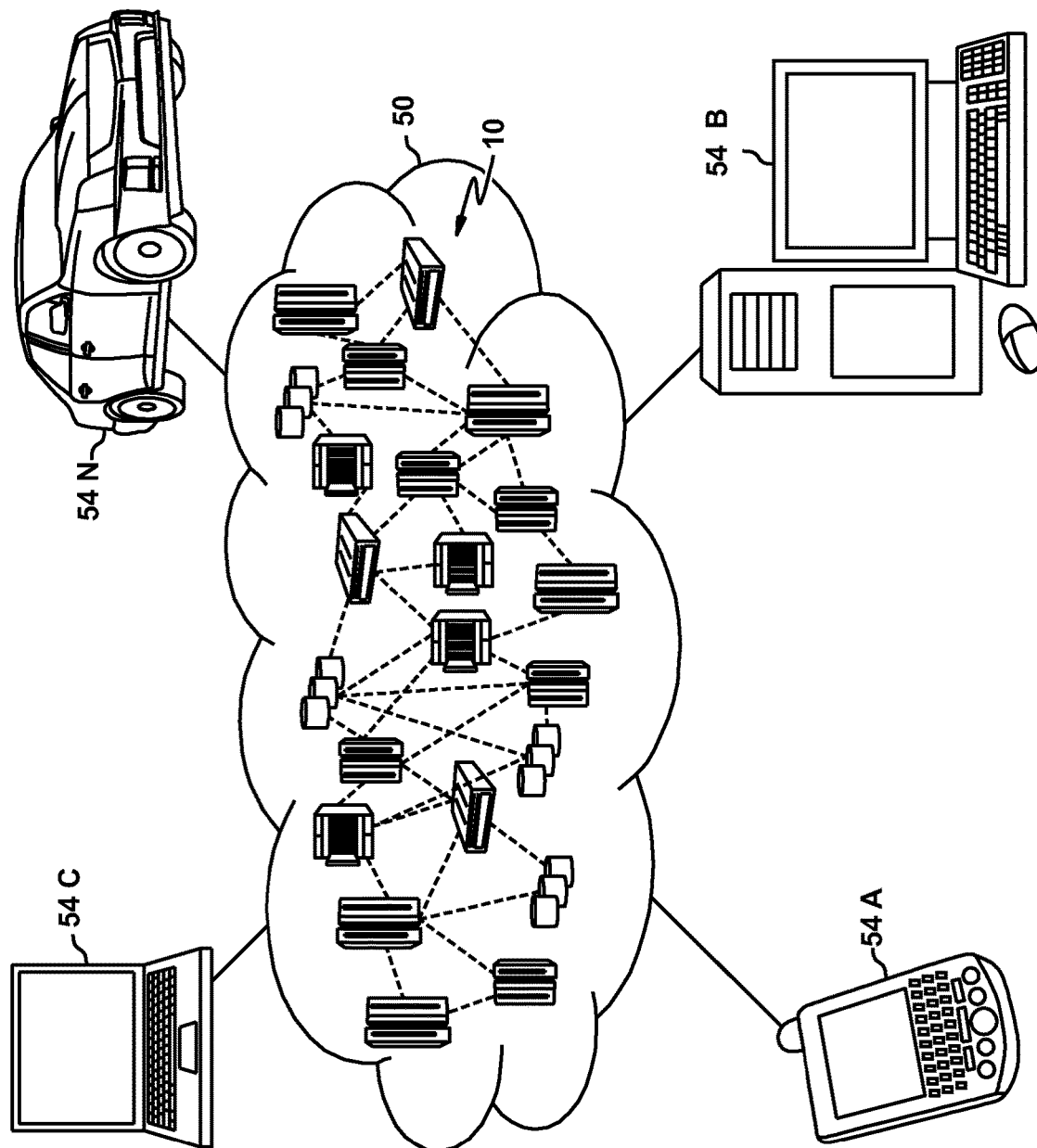
FIG. 8 depicts a cloud computing environment according to an embodiment of the present disclosure.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
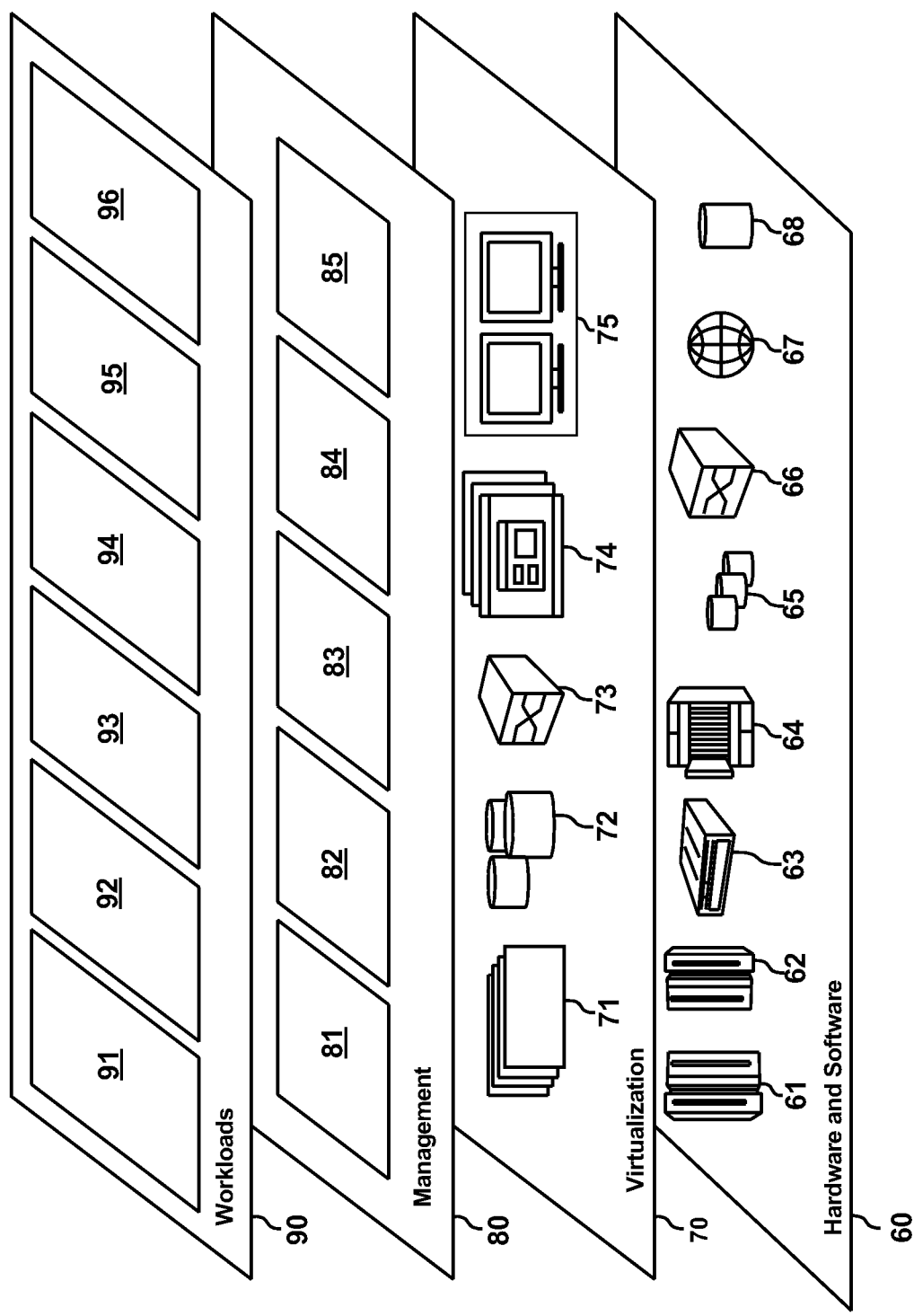
FIG. 9 depicts abstraction model layers according to an embodiment of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for generating a trusted platform module (TPM) swarm in a computing system, the method comprising:

detecting, by a processor that is physically connected to a plurality of TPMs, a unique identifier for each TPM of the plurality of TPMs;

creating an asymmetric owner key pair comprising a public owner key and a private owner key;

installing the public owner key on each TPM of the plurality of TPMs;

splitting the private owner key into a plurality of private owner key parts equal to a total number of the plurality of TPMs, wherein a private owner key part is equally distributed to each TPM of the plurality of TPMs;

creating an owner key policy for accessing the private owner key part associated with a respective TPM, wherein the owner key policy allows access to the private owner key part stored in the respective TPM if a predetermined number of unique identifiers corresponding to the plurality of TPMs are available;

creating an access policy for accessing secret data, wherein the access policy requires validating a software version and a hardware serial number associated with each TPM;
sealing the secret data in each TPM of the plurality of TPMs according to the access policy;
signing the access policy using the private owner key; and
sealing the private owner key part in the respective TPM using the owner key policy.

2. The method of claim 1, further comprising:
determining if each TPM of the plurality of TPMs has been processed to include a private owner key part and the owner key policy; and
erasing, in response to determining each of the plurality of TPMs has been processed, the private owner key.

3. The method of claim 1, wherein the access policy is a static policy that cannot be changed.

4. The method of claim 1, wherein the access policy is a dynamic policy that validates externally signed access conditions.

5. The method of claim 1, further comprising:
determining if an endorsement certificate of a TPM is valid; and
rejecting, in response to the endorsement certificate being invalid, the TPM from being added to the plurality of TPMs.

6. The method of claim 1, further comprising:
determining if an endorsement certificate of a TPM is valid;
accepting, in response to the endorsement certificate being valid, the TPM;
wiping the TPM; and
adding the TPM to the plurality of TPMs.

7. The method of claim 1, wherein the computing system is a server.

8. The method of claim 1, wherein the owner key policy allows the computing system to boot if a predetermined number of unique identifiers corresponding to the plurality of TPMs are available.

9. The method of claim 1, wherein the owner key policy allows the computing system to boot and be accessed, but prevents access to application secrets if a predetermined number of unique identifiers corresponding to the plurality of TPMs are not available.

10. The method of claim 1, wherein accessing the secret data implements a function performed by the computing system.

11. The method of claim 10, wherein the function initiates a software application.

12. The method of claim 1, wherein the secret data comprises one or more security keys for accessing one or more software applications.

13. A method for protecting the integrity of a server using a trusted platform module (TPM) swarm, the method comprising:
initializing a plurality of trusted platform modules (TPMs) within a server, wherein the plurality of TPMs are physically connected to a processor of the server;
reading a unique identifier corresponding to each TPM of the plurality of TPMs to determine a system state;
writing the system state to platform configuration registers (PCRs) of each TPM of the plurality of TPMs;
loading a sealed private owner key part into each TPM;
determining, by the plurality of TPMs, if a predetermined number of unique identifiers have been processed by validating a value of the PCRs to meet an owner key policy;
unsealing the private owner key part in each TPM where the value of the PCRs meets the owner key policy;
reconstructing, in response to the owner key policy being met, the private owner key from the private owner key part in each TPM;
loading secret data into each TPM meeting the owner key policy, wherein the secret data was sealed using an access policy signed with the private owner key;
validating a software version and a hardware serial number associated with the TPM according to the access policy; and
unsealing, in response to the access policy being met, the secret data.

14. A computing system comprising:
a plurality of trusted platform modules (TPMs); and
one or more processors physically connected to the plurality of TPMs, wherein the one or more processors are configured to perform a method, the method comprising:
reading a unique identifier corresponding to each TPM of the plurality of TPMs to determine a system state;
writing the system state to platform configuration registers (PCRs) for each of the plurality of TPMs;
loading a sealed private owner key part into each TPM, wherein the TPM is configured to perform a method, the method comprising:
validating the value of the PCRs to meet an owner key policy; and
unsealing the private owner key part in the TPM where the value of the PCRs meets the owner key policy;
reconstructing, in response to the owner key policy being met, the private owner key from the private owner key part of each TPM meeting the owner key policy;
loading secret data into each TPM meeting the owner key policy, wherein the secret data was sealed using an access policy signed with the private owner key;
validating a software version and a hardware serial number associated with each TPM according to the access policy; and
unsealing, in response to the access policy being met, the secret data.

15. The computing system of claim 14, wherein the method performed by the TPM further comprises:
denying, in response to failing to meet the access policy, access to the secret data.

* * * * *